United States Patent Office 2,731,396
Patented Jan. 17, 1956

2,731,396

COMBINATION CRUDE DISTILLATION AND CRACKING PROCESS

Clarke T. Harding, Hillside, Maurice W. Mayer, Summit, and Richard O. Wright, Cranford, N. J., assignors to Esso Research and Engineering Company, a corporation of Delaware Original application June 3, 1950, Serial No. 165,982, now Patent No. 2,644,785, dated July 7, 1953. Divided and this application July 30, 1952, Serial No. 301,716

12 Claims. (Cl. 196—49)

The present invention relates to the conversion of crude petroleum into more valuable mineral oil products. More particularly, the invention is concerned with an improved process for obtaining maximum yields of high quality low boiling products of the motor fuel and heating oil boiling ranges and desirably low yields of heavy products, such as fuel oils and tar with a minimum of treating steps and a substantially reduced investment and operating cost. In its broadest aspect, the invention involves a series of integrated distillation and catalytic conversion stages wherein products from said stages are conducted to a product fractionation stage and treated therein in such a manner that reduced crude obtained as liquid residue of a crude distillation stage is stripped with product vapors obtained in the crude distillation and/or conversion stages and all desirable fractions produced, such as motor fuel and heating oil and all the less desirable heavy material, such as fuel oil fractions, are recovered in optimum relative proportions and quality. More specifically, the invetion pertains to combination processes of this type wherein one of the conversion stages is catalytic reforming of naphtha, particularly in the presence of hydrogen. The present application is a division of application, Serial Number 165,982, filed June 3, 1950, now U. S. Patent 2,644,785, for Clarke T. Harding, Maurice W. Mayer and Richard O. Wright, entitled "Combination Crude Distillation and Cracking Process."

In conventional combination crude oil distillation and conversion processes the recovery of maximum yields of motor fuel and heating oil products has been usually accomplished by subjecting light and heavy naphtha fractions from the crude still to further fractionation and, if desired, to suitable thermal or catalytic refining treatments, such as reformation, isomerization, hydroforming, alkylation, etc., thermally or catalytically cracking a gas oil fraction from the crude still to recover further low boiling products by subsequent fractionation of the cracked products and subjecting the reduced crude to a further distillation at reduced pressures to produce tar and additional low boiling products, principally gas oil to be processed with the gas oil fraction from the crude still as mentioned above. These processes normally require as many product fractionators as there are conversion stages, yielding a plurality of streams of products of desirable boiling range. For economic heat recovery, large numbers of heat exchange apparatus are required both within each unit and in combination between units. Vast tank facilities must be provided to permit storage of the various products prior to blending in desired proportions. The vacuum distillation equipment normally used for working up the reduced crude is expensive with respect to investment, operation and maintenance. As a result of these complications, conventional type combination processes must be operated on a relatively large scale to be economical. In most cases, refining capacities in excess of, say, about 20,000 bbl./day of crude are required to make operations of this type pay while smaller refineries must be designed on the basis of an often undesirably high output of heavy fuel oil and other products of a realtively low commercial value.

The vacuum still for reduced crude distillation may be eliminated to realize substantial savings in fractionation equipment and tankage facilities by supplying substantially all the vaporous products of the various stages of a combination process as well as the reduced crude from the crude distillation to a single product fractionation stage and using these vapors to strip the reduced crude in the fractionation stage of all its distillable constituents. In this process the crude oil is subjected to distillation in a conventional crude distillaton unit to produce an overhead stream of light virgin naphtha, a separate heavy naphtha stream, a still heavier stream of the kerosene and Diesel oil range and reduced crude bottoms.

The reduced crude is passed directly to an upper portion of the lower contacting section of a substantially conventional fractionating column. The heavy naphtha stream is subjected to high temperature reforming or other conversion conducive to an improvement of its motor fuel qualities. The total vaporized effluent from this conversion stage is fed to the fractionating column at a point below the feed point of the reduced crude, substantially at the temperature of the conversion stage. The light virgin naphtha may enter the fractionating column likewise at a point below the reduced crude feed point after suitable additional heating, if desired. Various final product streams are recovered from the product fractionator which may include a fuel gas overhead, a low boiling fraction of the motor fuel boiling range, a heating oil fraction, a gas oil fraction, and a heavy bottoms fraction of the fuel oil range. Part of the gas oil fraction is passed to a catalytic cracking stage to be converted therein into additional amounts of motor fuel, Diesel oil, gas oil range cycle stock and heavy bottoms. The effluent of this stage is passed to the product fractionator likewise at a point below the reduced crude feed. In this manner, the reduced crude or equivalent thereof is subjected to countercurrent heating, vaporization and stripping actions with vapors from the gas oil cracking process as well as with the virgin and reformed naphtha vapors.

When operating substantially in the manner described above, extremely large volumes of process vapors are available and may be utilized for reduced crude stripping with the effect that the volume of heavy fuel finally produced may be kept at a minimum at least as low as and, if desired, even lower than it may be accomplished in conventional operation involving vacuum distillation of reduced crude. The total product naphtha is prepared as overhead product which has been maintained at high temperatures for a minimum time and is, therefore, of superior quality with respect to gum and color stability. A single heavy fuel fraction is obtained in which all heavy constituents formed in the various stages may be combined and which may be subjected to a single filtering treatment to recover a final low sediment fuel oil of best quality. These advantages are in addition to the obvious savings of heat exchange equipment resulting from the elimination of various intermediate heating and cooling operations and to those of intermediate tankage requirements resulting from the use of a single product fractionation stage.

In the type of operation described above the yield and quality of the motor fuel fraction recovered suffer to a certain extent from the fact that thermal reforming or catalytic reforming in the absence of substantial amounts of hydrogen must be used rather than catalytic hydroforming in the reforming stage to afford an efficient operation of the product fractionator. Catalytic hydroforming or similar processes are far superior to reforming processes carried out in the absence of hydrogen, with respect to product quality including the yield-octane number relationship, sulfur content and engine cleanliness of the gasoline. However, processes of this type involve a net production and recycling of large amounts of hydrogen. Introduction of this hydrogen together with the reformate into the common product fractionator would seriously interfere with the recovery of valuable hydrocarbon light ends or require a fractionator design of uneconomical dimensions.

The present invention overcomes this difficulty and affords various additional advantages as will be apparent from the description below wherein reference will be made to the accompanying drawing.

In accordance with the present invention, catalytic reforming of naphtha in the presence of hydrogen is integrated into a simplified combination process of the type specified above wherein reduced crude is injected into a combined product fractionator and reduced crude stripper together with vapors from other process stages which vapors serve to strip the reduced crude, at least a substantial portion of the hydrogen produced in the reforming operation being used to treat suitable hydrocarbon fractions of the combination process, outside the reforming stage and the combined fractionator-stripper. The preferred modification of the invention involves the incorporation into said simplified combination process, of catalytic naptha reforming operations of the type known as "platforming" wherein virgin and/or cracked naphtha is contacted with a platinum catalyst at elevated temperatures of about 800°–1000° F., high pressures of about 400–1000 p. s. i. g. and relatively high hydrogen recycle rates of about 3000 to 12,000 s. c. f./bbl. maintained by recycling hydrogen produced in the process. Processes of this type and suitable catalysts therefor are known in the art (see for instance U. S. Patents Nos. 2,478,916; 2,479,109; 2,479,110; Petroleum Processing, vol. 5, No. 4, pages 351–360). At the conditions specified, three major reactions occur, namely dehydrogenation of naphthenes to the corresponding aromatics, hydro-cracking of high molecular weight hydrocarbons into saturated hydrocarbons of lower molecular weight and isomerization of naphthas and straight-chain hydrocarbons. In addition, there takes place dehydrocyclization of straight-chain hydrocarbons directly into aromatics and desulfurization converting substantially all sulfur into hydrogen sulfide. Chiefly as a result of the high hydrogen partial pressure the catalyst retains its activity for many months without regeneration.

Other conventional hydroforming processes may be used for the purposes of the invention. For example, the virgin and/or cracked naphtha may be contacted in the presence of extraneous hydrogen and/or hydrogen formed in situ with such well known catalysts as the oxides of molybdenum, aluminum, vanadium and tungsten, with or without silica, supported on alumina or cobalt molybdate as such or molybdena supported on zinc aluminate, etc. at temperatures of about 800° to 1000° F., pressures of about 50 to 1000 p. s. i. g. and gas recycle rates of about 1000–3000 standard cu. ft. per bbl. of a recycle gas containing about 80% $H_2$. Continuous or intermittent regeneration of the catalyst may be employed, if necessary, to remove carbonaceous deposits by controlled burning with air in mixture with recycled flue gas from the regeneration process. Regeneration temperatures are generally limited to 1000°–1200° F. at any convenient pressure. The platforming or other conventional hydroforming treatment may be effected in fixed bed, moving bed, "fluid" or suspensoid type of operation, all in a manner known per se.

When incorporating such catalytic hydroforming processes into a simplified combination process of the type specified above in accordance with one embodiment of the present invention, hydrogen made available in the hydroforming stage is used to upgrade cracked fractions withdrawn from the combined fractionator-stripper by an upgrading treatment involving hydrogenation. For example, any desired portion of the gas oil recycle stock may be treated either with hydrogen separated from the reformer effluent or with the total reformer effluent. The treatment with hydrogen may be carried out at non-cracking conditions including temperatures of about 500° to 900° F. and pressures of about 750 to 4000 p. s. i. g. in the presence of conventional hydrogenation catalysts, such as the oxides or sulfides of groups V, VI and VIII heavy metals. Such hydrogenation improves the quality of the recycle stock as a catalytic cracking stock by hydrogenating coke-forming constituents such as polycyclic aromatics prior to cracking.

The hydrogen from the hydroforming stage may also be used to upgrade product light cracked gas oil within the heating or Diesel oil boiling ranges. For this purpose the type of product oil mentioned may be hydrogenated on the catalysts of the V, VI and VIII groups just mentioned at either substantially desulfurization conditions such as temperatures of about 500°–800° F. and pressures of about 100–500 p. s. i. g., or substantially hydrogenation conditions similar to those described with reference to the hydrogenation of gas oil recycle stock. Rather than using separated hydrogen, the total hydroformer effluent may be used to upgrade the light cracked product gas oil as will appear more clearly hereinafter.

The reformed naphtha may be blended with the naphtha fractions recovered from the fractionator-stripper, preferably after the latter have been subjected to conventional finishing treatments such as caustic washing and/or suitable sweetening processes known to the art. The reformed naphtha itself is of such high quality and purity as not to require further finishing of this character.

While these types of operation may require special gas-liquid separation and/or fractionation means in addition to the combined fractionator-stripper, the resulting increased investment is at least in part compensated by the improved quality of the final motor fuel blend. Furthermore, the naphtha finishing equipment may be substantially reduced in size whereby appreciable savings in investment are secured.

In accordance with another embodiment of the invention the total effluent of the catalytic naphtha hydroforming stage including all the hydrogen present in this stage is used without intermediate cooling to strip at least a portion of the reduced crude prior to its entry into the combined fractionator-stripper in a separate stripping stage operated substantially at the pressure of the hydroforming stage. Assuming a temperature of the reduced crude recovered from the crude still of about 600° to 750° F. and a temperature of about 800°–1000° F. of the hydroformer effluent this preliminary stripping may take place over a temperature range of about 650° to 800° F. at a pressure of about 100 to 1000 p. s. i. g. At these conditions, a substantial proportion of the gas-oil and lighter constituents of the reduced crude, say about 5 to 50%, will go overhead with the hydroformate and hydrogen. Hydrogen may then be separated from normally liquid overhead and recycled to the hydroforming stage after suitable reheating. The hydroformate containing the reduced crude strippings may be passed to the fractionating section of the combined fractionator-stripper or fractionated in a separate tower to produce gas oil to be used as catalytic cracking stock and product hydroformate which may be blended with the finished naphtha from the combined fractionator-stripper as described above. The prestripped reduced crude is passed to the stripping section of the combined fractionator-stripper to be further stripped therein with the effluent vapors of other process stages.

In all embodiments described above, excess hydrogen made available in the hydroforming stage beyond the recycle requirements of this stage may be passed to the stripping section of the combined fractionator-stripper to assist in stripping reduced crude therein. The naphtha to be hydroformed may be either virgin heavy naphtha alone or heavy naphtha withdrawn from the combined fractionator-stripper and containing both virgin and cracked naphtha or any suitable mixture of such heavy naphthas. It may be desirable to make all virgin naphtha available for stripping the reduced crude in the combined fractionator-stripper. In this event a combined virgin light and heavy naphtha stream may be passed directly to the stripping section of the fractionator-stripper and only a heavy naphtha fraction from the fractionator-stripper may be subjected to catalytic hydroforming as described above.

Having set forth its general nature and objects, the invention will be best understood from the more detailed description hereinafter which refers to the accompanying drawing wherein.

Figure 1:
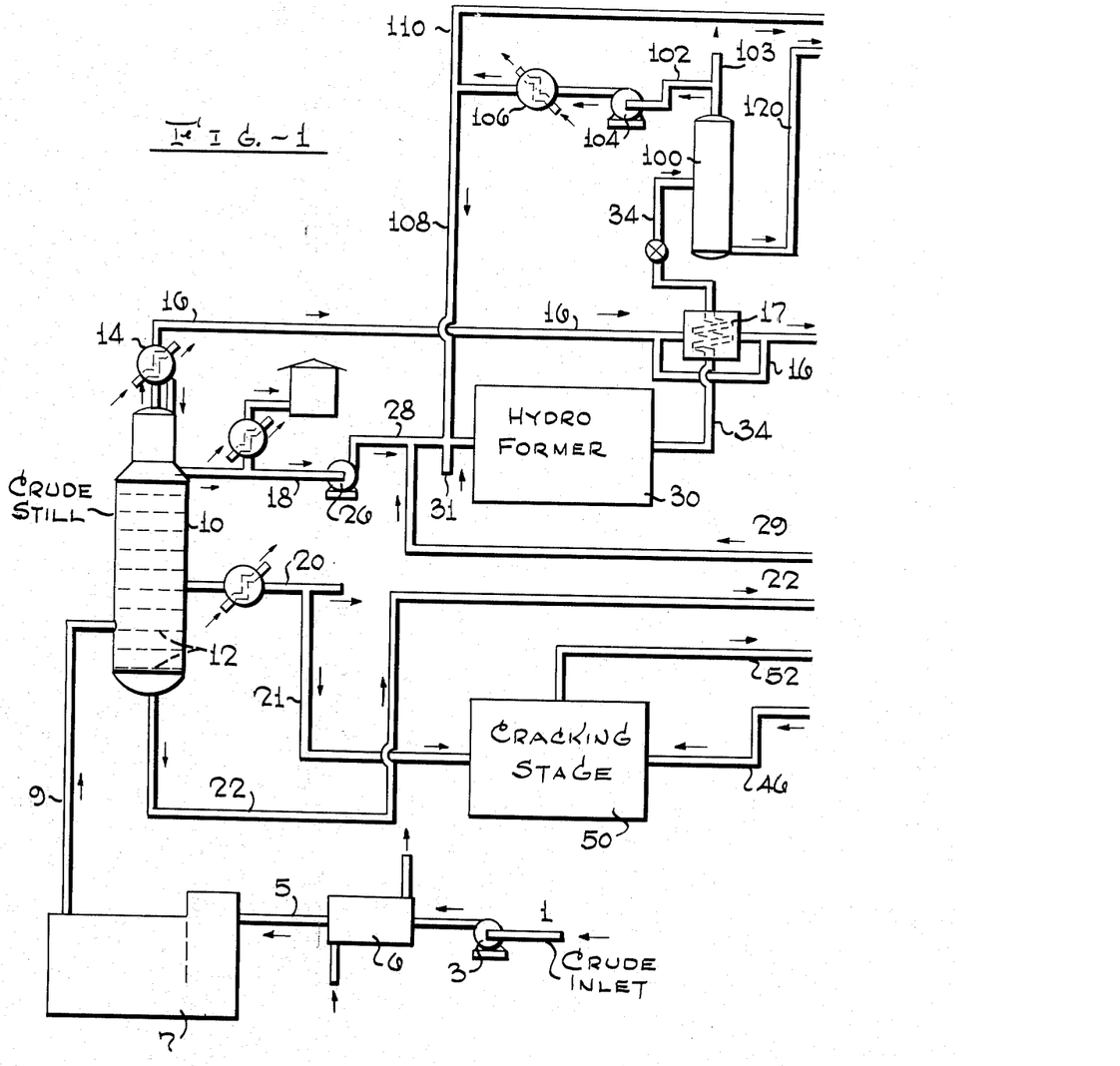
Figures 1 and 1A show a schematic flow plan of the combination process in accordance with the invention.
Figure 1A:
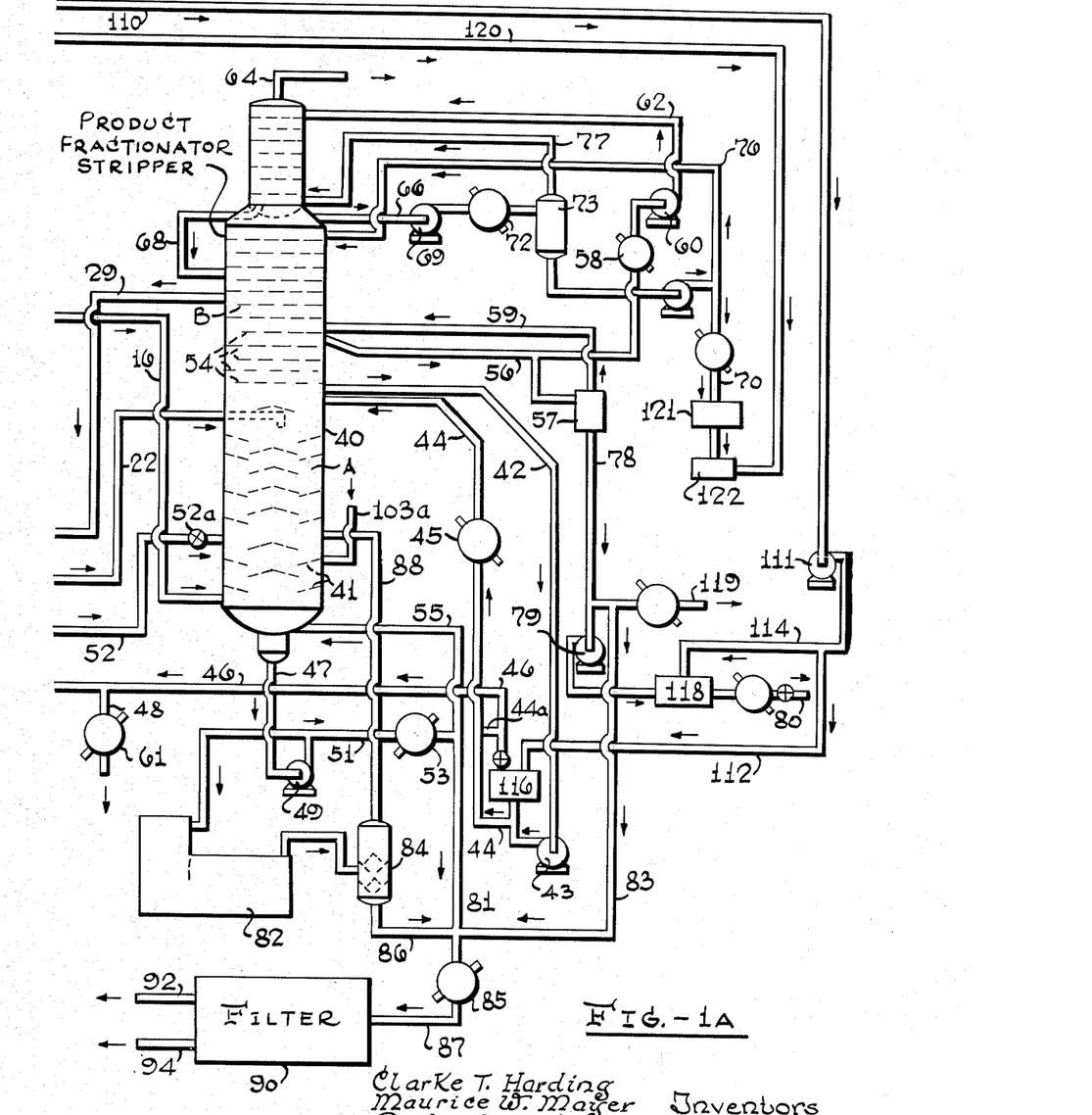

Referring now in detail to Figures 1 and 1A of the drawing, the system illustrated therein essentially comprises a crude still 10, a catalytic naphtha hydroforming stage schematically shown by element 30, a combined product fractionator-stripper 40, a cracking stage schematically illustrated by element 50, and fuel oil filtering facilities at 90. The functions and coaction of these elements will be forthwith explained using as an example the refining of a medium gravity crude of the type of Arabian Qatar crude in a refinery having a capacity of about 10,000 bbl. of crude per day. It should be understood, however, that the system may be used for the refining of different types of crude at a larger or smaller scale in a generally analogous manner.

In operation, the crude oil is pumped from line 1 by means of pump 3 via line 5 through heat exchangers 6 to a heating coil located in furnace 7 wherein it is heated to a temperature suitable to vaporize a substantial portion of the oil. The oil so heated is passed through line 9 to a lower portion of still 10 which it may enter at a temperature of about 600°–800° F. and a pressure of about 40–70 p. s. i. g. Still 10 may be provided with a plurality of horizontal bubble cap plates 12 to improve fractionation of the feed in a conventional manner. Reflux may be accomplished with the aid of partial condenser 14 arranged in the top of still 10. For the purposes of the present example, still 10 may be so operated that three distillate streams and distillation bottoms are produced as follows.

All crude constituents boiling below about 250° F. are removed together as a vapor stream of light virgin naphtha overhead through line 16 at a temperature of about 300°–350° F. This stream may amount to about 20–25% of the crude charged. A liquid stream of heavy naphtha having a boiling range of about 250°–400° or 500° F. is removed through line 18 from an upper portion of still 10 below condenser 14. About 20–25% of the crude charged is recovered through line 18. A kerosene or Diesel oil cut boiling within the range of about 400°–700° F. and amounting to about 17–23% of the crude is drawn off through line 20. The remainder of the charge, amounting to about 40–50% and consisting predominantly of constituents boiling above 700°–800° F. is withdrawn as reduced crude through line 22 from the bottom of still 10. The kerosene cut removed through line 20 is normally suitable for kerosene or Diesel oil purposes without further treatment and it may be passed directly to storage. The other fractions may be treated in accordance with the present invention as will be forthwith described.

The light virgin naphtha vapors in line 16 may be passed directly to a lower portion of product fractionator 40. If desired, this vapor stream may be preheated to about 800°–1000° F. to conform with the heat requirements of fractionator 40. This may be done by by-passing at least a portion of the vapors in line 16 through a heat exchanger 17 in indirect heat exchange with hot products from hydroforming stage 30 operated as will be described hereinafter.

The heavy naphtha stream may be pumped by pump 26 through line 28 at a pressure of about 600–900 p. s. i. g. to a catalytic hydroforming stage 30. This hydroforming stage may be of any conventional design well known in the art suitable for a "platforming" operation or a regenerative hydroforming operation of the type specified above. Equipment suitable for this purpose will be described below in greater detail with reference to Figures 2 and 3. For the present example, a conventional catalytic reforming operation carried out at about 800° to 1000° F., 50 to 1000 p. s. i. g. pressure, nominal oil residence time of about 0.5 to 2.5 hours calculated as cold oil in contact with catalyst, and hydrogen recycle rates of about 500 to 7000 s. c. f./bbl. of oil using a catalyst, such as molybdena supported on alumina, in fixed bed operation is referred to. In addition to the virgin naphtha supplied to hydroforming stage 30 via line 28, a hydrocarbon stream of similar boiling range derived from the fractionator section of tower 40 may be fed to hydroforming stage 30 via line 29 in any desired proportion. At the conditions specified the octane rating of the naphtha may be increased from about 25 to 40 to about 80 to 100 Research Octane Number without excessive cracking to normally gaseous hydrocarbons and carbon. A plurality of hydroforming reactors may be provided alternating between onstream and regenerating cycles, oxidizing gases such as air, steam, flue gases or mixtures thereof, being used in the regenerating cycle to remove carbon from the catalyst all in a manner known per se. Of course, any type of continuous operation such as fluid, moving bed or suspensoid operation may be used wherein the catalyst is continuously circulated between reactor and regenerator vessels. If desired, extraneous hydrogen may be supplied to hydroforming stage 30 via line 31.

The total effluent of hydroformer 30 is passed through line 34 via heat exchanger 17 to a stabilizer tower 100 wherein hydrogen and normally gaseous hydrocarbons such as $C_1$–$C_3$ hydrocarbons are separated from normally liquid hydroformate at temperatures of about 80° to 120° F. and pressures of about 100 to 1000 p. s. i. g.

Gases containing about 40 to 90% of hydrogen and amounting to about 1000 to 9000 s. c. f./bbl. of feed are withdrawn from stabilizer 100 through line 102 and passed through recycle booster 104 and reheater 106. An amount corresponding to about 500 to 7000 s. c. f. of hydrogen per bbl. of feed may be passed via line 108 to hydroformer 30 substantially at the temperature and pressure of the latter. The remainder of the gases in line 102 or any desired portion thereof may be passed through line 110 via booster 111 and lines 112 and/or 114 to hydrogenation stages 116 and/or 118 which may be used to improve the cracking characteristics of cracking recycle stock supplied from tower 40 through line 42 or to improve the quality of product light gas oil recovered from tower 40 via line 78 as will appear more clearly hereinafter. Any excess gases may be withdrawn through line 103 and passed through line 103a to the bottom portion of fractionator-stripper 40 as an additional stripping agent or used as fuel gases in the system. When operating in this manner for example, the gravity of recycle gas oil can be increased 2–15 degrees, and the stock made as desirable as is virgin feed for catalytic cracking.

The hydroformate separated in stabilizer 100 is withdrawn through line 120. This material may be blended without further treatment in tank 122 with finished gasoline recovered from tower 40 as will appear more clearly hereinafter. The hydroformate so recovered may amount to about 10 to 25% on crude.

Returning now to the reduced crude in line 22, this stream may be passed directly to the lower portion of fractionator 40, substantially at the temperature of its withdrawal from still 10. Line 22 feeds into fractionator 40 at a point above the feed point of line 16. In this manner, the vapors supplied through line 16 pass upwardly through fractionator 40 against the downwardly flowing reduced crude to strip the latter of vaporizable constituents. This effect and the operation of fractionator 40 will be described in greater detail later on.

At this point it is noted that a side stream of gas oil range hydrocarbons amounting to about 45–60% on crude and boiling between about 600° and 1000° to 1100° F. which is suitable as a catalytic cracking stock, may be withdrawn from an intermediate section of fractionator 40 via a gas oil reflux system comprising pump 43 and lines 42, 44, and passed either via line 44a or through hydrogenation stage 116 which will be described below, to line 46 and a catalytic cracking stage 50. Any conventional cracking system adapted to convert gas oil range hydrocarbons into lower boiling oils, particularly of the motor fuel range, may be used. Continuous or batch operation may be employed in fixed bed, moving bed, "fluid" or suspensoid systems. Heat required for cracking may be supplied as preheat of process materials and/or as sensible heat of exothermically regenerated catalyst or in any other conventional manner. Modified natural or synthetic clay or gel type catalysts such as activated montmorillonite clays, silica-alumina, silica-magnesia composites and other conventional cracking catalysts may be employed at temperatures of about 800°–1000° F. and pressures of about atmospheric to 25 p. s. i. g., all in a manner known per se. A cracking system offering particular advantages in connection with the present invention will be described in greater detail later on with reference to Figure 2 of the drawing.

The total hydrocarbon effluent of cracking stage 50 is passed substantially at the cracking temperature of, say, about 800°–1000° F. through line 52 to the lower portion of fractionator 40, preferably at a point intermediate between the feed points of the reduced crude on the one side and of the virgin naphtha on the other side. If cracking stage 50 is operated at an elevated pressure, the pressure may be released by valve 52a to fractionator pressure. In most cases, about 95–100% of the cracked material enters fractionator 40 in the vapor state to enhance the stripping action of the vapors supplied through line 16, while any unvaporized constituents of the cracked material are in turn subjected to stripping by those vapors introduced through line 16.

As indicated in Figure 1A, fractionator 40 comprises a lower stripping section A and an upper combined fractionation-absorption section B. Both sections are provided with suitable means for improving the countercurrent contact between downflowing liquid and upwardly flowing vapors. For the purpose of stripping, a disc-and-doughnut baffle arrangement has been found to be most efficient and such is shown schematically for section A by elements 41. Section B is illustrated to contain a number of bubble cap plates 54 to enhance the efficiency of the fractionation-absorption process. Sections A and B may operate as follows.

Stripping section A receives, aside from the vapor and liquid streams supplied through lines 16, 52 and 22, a liquid top feed comprising a gas oil cut removed from the bottom of section B via line 42 and supplied to section A via line 44. This gas oil is fed to section A to provide control over the reflux and heat removal in that section in order to obtain the desired end point and clean up on the gas oil. All the heat required for stripping and fractionation in fractionator 40 is preferably supplied as total heat, i. e., sensible plus latent heat of the hydrocarbon streams entering section A to maintain a temperature of, say, about 820–830° F. in the lowest portion of section A. The vapors rising through section A strip the downwardly flowing gas oil cut, reduced crude and cracked liquid products of substantially all their distillable constituents and this vapor mixture passes on at a temperature of about 700°–750° F. into fractionation-absorption section B to be treated as will be described later on.

The reduced crude from line 22 which may contain as much as about 75% of gas oil suitable for feed to the catalytic unit is countercurrently stripped and heated by the cracked vapors, at, say, about 875° F. and 8 p. s. i. g. and then by the virgin naphtha vapors at, say about 800° F. The partial pressure effect of the other streams and the heat content thereof are sufficient to cause the gas oil constituents of the reduced crude to vaporize and to supply the required heat. The net effect of the process in section A then is (1) a bottom stream of unfluxed fuel oil amounting to about 10–15% on crude and consisting of flashed reduced crude containing about 0.3% of heavy slurry oil from the catalytic operation, blended automatically so that it may be fluxed with about 50% of light diesel oil blending stock for fuel oil viscosity correction; (2) vapors containing all of the distillate products to be obtained from fractionator 40 and leaving section A overhead at about 800° F.

A heavy material containing all the non-distillable constituents of the crude charged and of the fractions converted in stages 30 and 50 collects at about 820°–830° F. in the bottom zone of section A from which it may be withdrawn via line 47. If desired, the temperature in the bottom of section A may be reduced to, say, about 700° F. by recycling heavy bottoms from line 47 by means of pump 49 via cooler 53 and line 55. The bottoms quenching may be desirable to prevent cracking and coking of the heavy liquid products. Combined reduced crude amounting to about 10 to 15% on crude may be recovered through line 31 to be further treated as will appear hereinafter.

At the conditions of the present example about 500 to 1000 mols/hr. of hydrocarbon vapors will be available to strip in section A about 100–200 mols/hr. of liquid. This favorable vapor-liquid ratio results in efficient stripping in section A. The number of disc-and-doughnut baffles and the dimensions of section A depend largely on the character of the crude charged and the products desired. For the purposes of the present example, this section may be approximately 12′ in diameter and 30′ in height and is equipped with 7 sets of disc-and-doughnut type contacting devices. Whenever the vapor-liquid ratio in section A is undesirably low, the operation of crude still 10 may be changed so as to take a wider naphtha cut or even all the light and heavy virgin naphtha overhead through line 16 to increase said ratio, while correspondingly increasing the proportion of naphtha supplied to hydroformer 30 from tower 40 via line 29. In an extreme case, the entire naphtha feed of hydroformer 30 may be so supplied from tower 40 without substantial changes in the operating conditions described above.

Vapors passing upwardly to section B of the fractionator 40 are fractionated with gas oil reflux through line 44 and cooler 45. Gas oil may be withdrawn through line 42 at about 650°–750° F. and may be divided into 3 streams, namely (1) reflux through line 44 as described; (2) a liquid product amounting to about 2.5–3% on crude for heavy Diesel oil blending through line 48 and cooler 61 to tankage; (3) about 50–55% on crude of catalytic feed stock which is fed directly to the cracking section by pump 43 through line 46. This gas oil contains all of the virgin 600°–1050° F. cut point fraction and all of the cycle gas oil, and the gas oil is hence run to extinction. Any or all of these three streams may be upgraded in hydrogenator 116 as described above.

For example, all the heavy gas oil not to be returned as reflux to fractionator 40 via line 44 may be supplied by pump 43 to hydrogenation stage 116 and hydrogenated therein on nickel tungsten sulfide as the catalyst at a temperature of about 750° to 800° F., a pressure of about 2500 to 3000 p. s. i. g., a liquid throughput of about 1 to 2 v./v./hr. and a hydrogen feed rate of about 2500 to 3000 standard cu. ft. per bbl. of oil in fixed bed operation. At these conditions about 1000–1200 standard cu. ft. of hydrogen per bbl. is consumed in the hydrogenation operation. The API gravity of the heavy cycle gas oil is increased by about 10–12 units and substantially all sulfur is removed. The hydrogenated gas oil may then be passed on through line 46 as described above.

Passing now to section B of fractionator 40, it is noted that in most conventional catalytic cracking and similar refining operations, products are fractionated at low pressures to produce a gas and low pressure distillate. The gas stream contains appreciable quantities of gasoline constituents and it is, therefore, necessary to compress, absorb, and refractionate this stream to recover its gasoline constitutents. This may be avoided by combining both low pressure absorption and fractionation in the upper section B of fractionator 40. For this purpose, one of the "pumparounds" normally used merely for heat removal and returned to a point close to its withdrawal may be used as an absorption medium by returning it to a point substantially above that from which it is withdrawn.

The operation of the upper part of section B is disclosed and claimed specifically in the copending Rich et al. application Serial No. 153,332, filed April 1, 1950, and assigned to the same interests. It will be briefly described herein insofar as it contributes to the essential advantage claimed for this invention, which resides in making small refineries fully competitive with large refineries. For specific details said copending Rich et al. application is here referred to.

Product vapors leaving the gas oil fractionating section and entering the heating oil withdraw plate contain heating oil, naphtha and gas. In the section immediately above the heating oil withdrawal line 56, these product vapors which may be at about 510°–520° F. are cooled by contact with cool heating oil at about 130° F. entering the tower through line 68. Heating oil is condensed out and falls along with the cooled part entering through line 68 and both are withdrawn from the tower through line 56. The cool heating oil in line 68 is saturated with $C_5$, $C_4$ and $C_3$ homologues to form a fat oil. The light fractions are stripped out by ascending naphtha and gas product vapors, thus increasing the concentration of said fractions in the naphtha condensing zone and increasing the absorption thereof in the naphtha.

Light gas oil is withdrawn at about 480°–500° F. through line 56, most of it being cooled in cooler 58 and returned to the top of section B by pump 60 and line 62 as absorber lean oil, the remainder being stripped in stripper 57 and taken through line 78 to flux via line 83 and product via line 119, vapors being returned through line 59. Any desired portion of the stream in line 78 may be passed through hydrogenation stage 118 to be treated therein with $H_2$ supplied via lines 110 and 114.

For this purpose, the light gas oil in line 78 may be supplied by pump 79 to hydrogenation stage 118 and hydrogenated therein for example, on nickel tungsten sulfide as the catalyst at a temperature of about 700° to 800° F., a pressure of about 175 to 225 p. s. i. g., a liquid throughout of about 0.75 to 1.25 v./v./hr. and a hydrogen feed rate of about 800 to 1200 standard cu. f. per bbl. of oil in fixed bed operation. At these conditions hydrogen consumption in this operation is about 200 to 300 standard cu. ft. per bbl. and the light gas oil recovered through line 80 will be substantially completely desulfurized.

Product vapors entering the portion of section B which lies above the inlet of line 68 thus consist of the naphtha fractions and gas fractions normally encountered plus an abnormal quantity of $C_4$, $C_5$, and $C_6$ which were absorbed as previously explained in the top of section B. Such vapors and heating oil are fractionated by reflux pumped back through line 76 and the fractionated vapors may be taken from the tower at about 5 p. s. i .g. and 215° F. through line 66 and may be compressed by a one stage blower 69. Naphtha with an excess of light fractions is condensed in condenser 72, stripped of the excess light fractions in stripper 73 and, except for the part returned as reflux through line 76, sent to final product tankage through line 70.

Gas and light fractions are led back to the absorber portion of section B through line 77 where countercurrent absorption of the desired light fraction by the lean oil as previously described takes place. The number of plates between lines 56 and 62 is preferably increased by about 10–15 over that of normal fractionator designs. By using this technique it is possible to absorb essentially all of the $C_5+$ fractions in the gas entering the top section of fractionator 40. In addition, as much as 75% of the $C_4$ components can be absorbed. The gas leaving the top of fractionator 40 through line 64 is thus stripped of its valuable gasoline components and can be passed directly to fuel uses. A naphtha or gasoline cut may be recovered via line 66. Such gasoline can be withdrawn at temperatures of about 120°–150° F. in spite of the low pressure employed. If the crude is such or the distribution of products so demand, it is possible to operate section A at pressures below that in the absorber portion in the top of section B—say 5–15 p. s. i. in order to permit reduction of crude to very low bottoms, while at the same time obtaining high $C_4$ recoveries in section B by maintaining higher pressure.

The gasoline fraction is uncontaminated with the "pump-around" medium as described above and is condensed either in the tower by naphtha pump-back or in an external condenser, part of the naphtha being returned to the tower for fractionation. The number of plates to be provided in section B depends on the type of crude charged and the products desired. For the purposes of the present example, 2 plates may be used between the reduced crude inlet and gas oil withdrawal, 4 between gas oil and heating oil, 5 for stripping of gas fractions from the heating oil, 3 for naphtha-heating oil fractionations, and 10–15 plates for the absorption of light components in the top portion of section B.

As indicated in the drawing, final products may be recovered from tower 40 as follows. Gasoline of 400° F. end point amounting to about 35 to 45% on crude and having an octane rating of about 80–90 Research may be passed via line 70 to a conventional finishing stage 121 and then to tank 122 to be blended therein with the hydroformate supplied via line 110. Gasoline may be recirculated by pump 74 via line 76 to section B to serve as reflux. Final heating or light diesel oil may be recovered via line 78 at a rate of about 0.5–1.0% on crude. About 2–3% on crude of a heavy diesel oil stock may be obtained via line 48. A naphtha fraction somewhat heavier than that of the gasoline in line 66 and having a boiling range of, say, about 200 to 400° F. may be withdrawn from a point intermediate between the withdrawal point of line 56 and the feed point of line 68 to be passed via line 29 to hydroformer 30 as described above. The amount of naphtha so withdrawn may vary between 0 and about 45% on crude depending on the proportion of virgin naphtha directly supplied to hydroformer 30 via line 28.

Returning now to the combined reduced crude type bottoms withdrawn through line 81, they may, if desired, be blended with gas oil or lighter fractions supplied through line 83 to adjust their viscosity to meet specifications. The bottoms may then be cooled to about 200°–500° F. in cooler 85 and passed through line 87 to filtering facilities 90. Conventional sand filters, rotary or porous sintered ceramic filters may be used to remove from the combined residue all suspended or slurried solid particles, such as coke, catalyst carried over from cracking stage 50, etc. The solids removed in filtering facilities 90 may be discarded via line 92 or passed to catalyst recovery means (not shown). A fuel oil grade residuum is recovered via line 94. Combination filtering in this manner of thermally cracked tar, catalytic slurry and crude residuum avoids "compatability" problems arising upon conventional blending of materials of this type and permits the recovery of a fuel oil relatively low in sediment.

The system illustrated in Figure 1 permits of various modifications. For example, one or more reduced crude visbreaking or coking stages may be included. In a "fluid" coking process in which the coke is burned in the unit, excess high level heat is produced which may be used to furnish the heat required in the heat exchangers 303, 310, 344 and 307 of the combination unit, for example, in the hydroformer section shown in Figure 3. Certain of the effects contemplated by such coking stages may be accomplished by operating the bottom portion of section A of fractionator 40 at visbreaking conditions, for example at 875°–950° F. Instead of, or in addition to, this type of operation, the reduced crude in line 22 may be subjected to a conventional thermal or catalytic coking or visbreaking treatment. The total effluent of such a coking stage, with or without the coke formed may be passed on through line 22 to an upper portion of stripping section A of fractionator 40 to be treated therein as above described. Similarly, part or all of the bottoms in line 47 may be subjected, for example, in unit 82 to visbreaking and/or coking to produce a heavy residuum and coke to be passed on from a stripper 84 through lines 86 and 81 to filtering means 90 and lighter materials which may be returned from stripper 84 through line 88 to a middle portion of section A to be subjected therein to stripping and fractionation as described above. Any desired portion of the kerosene cut in line 20 may be passed via line 21 to cracking stage 50 to be treated therein as described above for the gas oil supplied through line 46.

Figure 2:
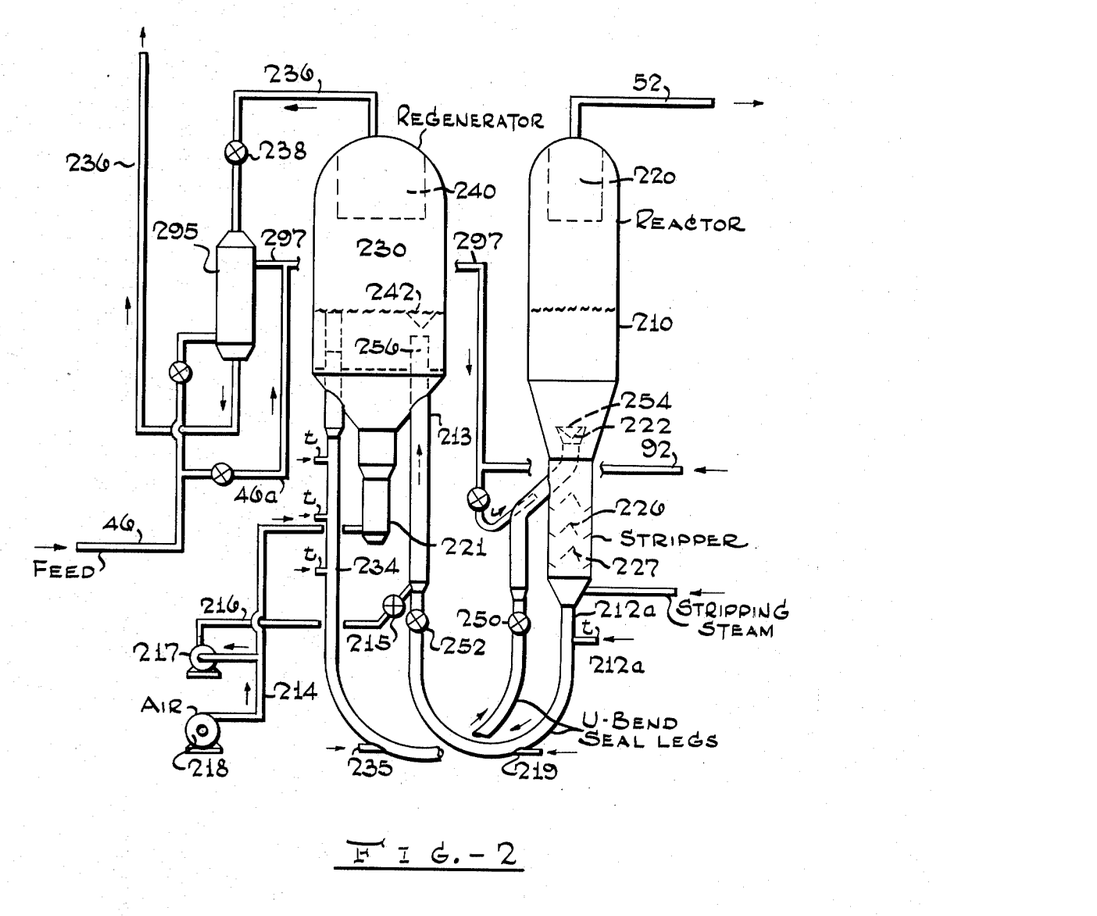
Figure 2 illustrates semi-diagrammatically and in greater detail a catalytic cracking system of particular utility for the combination process of the invention.

While a variety of catalytic cracking systems may be used as cracking stage 50, "fluid" catalytic cracking involving the continuous production of cracked effluent and continuous catalyst circulation between cracking and regeneration stages is most suitable for the purposes of the present invention. A system of this type which may be incorporated to particular advantage into the process of the present invention will be briefly described hereinafter with reference to Figure 2 of the drawing. It should be understood, however, that no claim is made herein to the system of Figure 2 in itself which forms a part of the present invention only insofar as it supplies a catalytically cracked effluent suitable for the purposes of the present invention and as it is particularly adapted for operations of moderate and small scale for which the process of the present invention has greatest advantages. A system of the type shown in Figure 2 is disclosed and claimed as such in the copending Packie application Serial No. 159,276, filed May 1, 1950, and assigned to the same interests. This copending application may be referred to for all details of operation and design which are not specifically disclosed herein.

Referring now to Figure 2 of the drawing, the system illustrated comprises a fluid type reactor 210 and a fluid type catalyst regenerator 230 arranged approximately at the same level. Catalyst transfer between the vessels is effected through U-bend connecting lines 234 and 212. Overflow line 234 extends up into the regenerator 230 to the desired catalyst level. Catalyst overflows from the top of the catalyst bed into the withdrawal well of line 234 and flows through the U-bend into reactor 210. The upper portion of line 234 acts as a conventional standpipe aerated with steam through taps t while the U-bend section functions as a seal to prevent reverse flow of oil vapors into the regenerator 230. To initiate the catalyst flow during the starting-up period, steam may be injected through line 235 into the U-bend. The gas oil feed from line 46 may be passed substantially at the temperature at which it is recovered from fractionator 40 through lines 46a and 297 into line 234 close to its point of entrance into reactor 210. If desired, the gas oil may be preheated to 600°–650° F. in exchanger 295 in heat exchange with regenerator flue gases and passed on to line 297. Spent catalyst flows from reactor 210 through a stripper 226 and line 212 to the regenerator 230 via a dense phase riser 213 which terminates at a point closely below the dense phase level in regenerator 230. Densities of the order of 15–25 lbs. per cu. ft. may be used in riser 213 as compared to conventional regenerator risers which operate at densities of about ½–2 lbs. per cu. ft. The density in this dense phase riser is about ½ of that in the standpipe section of pipe 212. The greater catalyst density in the reactor 210, stripper 226 and standpipe portion 212a of line 212 as compared to the lesser density in the riser portion 213 of line 212 provides the driving force for catalyst circulation between the vessels. For start-up purposes a steam injector 219 located in the U-bend may be used. The density in the riser 213 is maintained at a lower level than that in standpipe 212 by the injection of air from booster blower 217 through line 216 into riser 213. The rate of catalyst circulation is controlled by regulation of the injection air rate through control valve 215. Control valve 215 may be controlled as a function of the reactor temperature to maintain the latter at any desired level. The remainder of the combustion air is introduced into the regenerator via an auxiliary burner 221 from blower 218 and line 214. Auxiliary burner 221 may be used during the start-up to supply heat to the system. No combustion takes place therein when the system is in operation.

The effectiveness of the U-bend seal legs stems from the fact that the air injection point in line 212 and the oil injection point in line 234 are located above the U-bend seals.

The pressure in the regenerator 230 may be controlled by a throttle valve 238 arranged in stack line 236 of regenerator 230. In this manner, regenerator 230 may be maintained at all times at substantially the same pressure as reactor 210, for which purpose a differential pressure controller may be used to operate valve 238. If the pressure differential between the two vessels is thus maintained at a suitable level, the seal legs of pipes 212 and 234 will prevent gases from passing from one vessel into the other. As a further safety precaution, a valve 250 may be arranged in the riser portion of pipe 234 and a similar valve 252 in the riser portion of pipe 212. The valve 250 is closed in the event that the catalyst flow through pipe 234 ceases. Similarly, valve 252 is closed in the event the catalyst flow through pipe 212 ceases.

Both reactor 210 and regenerator 230 are preferably designed for high velocity operation involving linear superficial gas velocities of about 2–4 ft. per second. In order to reduce catalyst losses, regenerator 230 and reactor 210 may be provided with two stages of cyclones 240 and 220, respectively. The amount of catalyst carryover to fractionator 40 may thus be considerably reduced. If desired, a slurry of catalyst recovered from filtering means 90 via line 92 may be returned directly to reactor 210 via line 297.

Distributing grids 254 and 256 may be employed in the vessels 210 and 230, respectively. However, distributing cones 222 and 242 may be provided below grid 254 and above the outlet of riser 213. Stripper 226 may be provided with disc-and-doughnut baffles 227.

In other respects, operation of the system illustrated in Figure 2 may be substantially conventional, suitable conditions including temperatures of about 800°–1000° F., preferably about 800°–900° F., pressures of about atmospheric to 100 p. s. i. g., preferably about 5–15 p. s. i. g., catalyst hold-up of about 15–30 tons, and catalyst to oil ratios of about 3–10, preferably about 5–7 by weight.

The advantages which render the system illustrated in Figure 2 particularly suitable for the present invention accrue chiefly from the described combination of the overflow principle with the provision of seal legs in the catalyst circulation pipes, preventing gas blow back and the dense phase riser 213 terminating closely below the bed level. These advantages are numerous and important. They include smaller line diameters and simpler mechanical construction of the solids circulation lines; the elimination of slide valves for controlling catalyst flow with attendant reduction in pressure drop to about 1/10 of conventional pressure drops and in maintenance requirements; reduction in vessel elevation by about 60%; reduced air pressure resulting in investment savings since at least 90% of the air passes directly to auxiliary burner 221 at a relatively low pressure; reduced size and cost of regenerator and reactor which may be shop fabricated rather than field fabricated; etc.

The temperature and pressure conditions specified in the above example for the operation of fractionator 40, particularly of stripping section A are those best suited for the crude here specified. They may vary to a certain extent depending chiefly on the gravity of the crude charged, as will be readily understood by those skilled in the art. For example, for a lighter crude the temperature in the bottom of section A may be somewhat lower, and vice versa.

Figure 3:
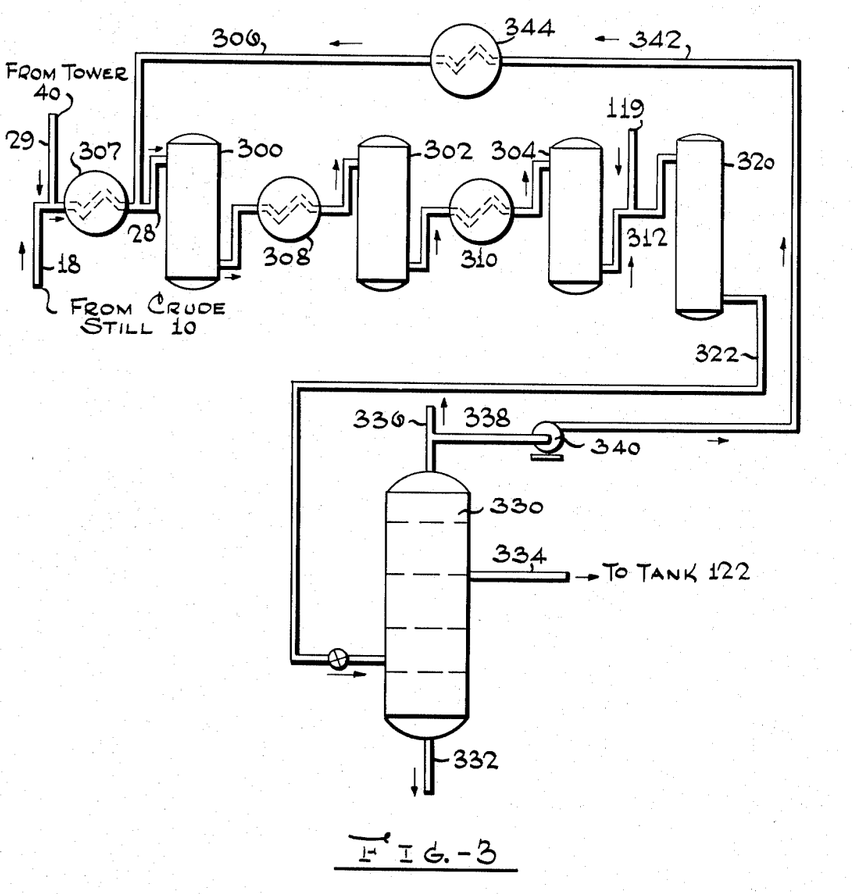
Figures 3 and 4 illustrate in a similar manner preferred embodiments of the hydroforming section of the system of Figure 1.

Another embodiment of the invention is illustrated in Figure 3 which, for the sake of simplicity, shows only those elements which differ in design and/or operation from those of Figures 1 and 1A, and in addition some of the pipe lines of Figures 1 and 1A to clarify the manner in which the equipment illustrated in Figure 3 is to be linked up with the combination unit described with reference to Figures 1 and 1A. In essence, the elements shown in Figure 3 are intended to take the place of hydroformer 30, stabilizer 100 and hydrogenators 116 and 118 of Figures 1 and 1A.

Referring now in detail to Figure 3, the system illustrated therein essentially comprises three catalytic hydroformers 300, 302 and 304 connected in series, a hydrofining stage 320 and a stabilizer-fractionator 330. The function of these elements in a combination unit of the type illustrated in Figures 1 and 1A will be forthwith described with reference to a "platforming" operation taking place in hydroformers 300, 302 and 304. It should be understood, however, that other types of catalytic hydroforming may be carried out in this system in a substantially analogous manner.

In operation, naphtha having a boiling range of about 150° to 400° F. may be passed through line 28 to hydroformer 300 via reheater 307 at a temperature of about 900° to 1000° F., a pressure of about 50 to 1000 p. s. i. g. and in an amount of, say, about 15 to 45% on crude. This naphtha may be supplied from crude still 10 via line 18 and/or from tower 40 via line 29 in any desired proportion, as described with reference to Figures 1 and 1A. An amount of about 500 to 7000 s. c. f./bbl. of recycle hydrogen is supplied to hydroformer 300 from line 306 at hydroforming pressure and a temperature of about 900° to 1200° F. Hydroformers 300, 302 and 304 contain a platinum group catalyst such as platinum or palladium supported on alumina pellets preferably arranged in fixed beds. The naphtha-hydrogen charge passes in series through hydroformers 300, 302 and 304 and is reheated between stages in reheaters 308 and 310 to maintain similar temperatures in the three stages. Suitable "platforming" conditions to be maintained in hydroformers 300, 302 and 304 include temperatures of about 800° to 1000° F., total pressures of about 400 to 1000 p. s. i. g. and hydrogen recycle rates of about 3000 to 12,000 s. c. f./bbl. At these conditions the octane number of the naphtha is improved anywhere from 30–60 points and the sulfur removed almost completely. The catalyst retains its activity for many months whereupon it may be replaced with fresh or regenerated catalyst, no continuous or frequent periodic regeneration being required.

The total effluent from the hydroforming or "platforming" stages passes through line 312 to hydrofining stage 320. Simultaneously, hydrofining stage 320 receives via line 119 all or any desired portion of the light gas oil range product fraction recovered from tower 40 prior to hydrogenation in hydrogenator 118. The combined charge is treated in hydrofining stage 320 with a hydrofining catalyst such as oxides or sulfides of Group V, VI and VIII metals at temperatures of about 500° to 800° F., pressures of about 50 to 1000 p. s. i. g. and throughputs of about 0.5 to 5 v./v./hr. At these conditions substantially complete conversion of undesirable constituents of the light gas oil fraction, such as sulfur compounds, etc. takes place by straight hydrogenation or hydrogen transfer from the platformate, without appreciably affecting the quality of the platformate. As a result of the high hydrogen partial pressure, catalyst deactivation by carbon deposition is relatively slow, eliminating the requirement of continuous or frequent periodic regeneration. Fixed bed operation is, therefore, suitable for hydrofining stage 320. However, any conventional continuous or periodic regeneration system involving fluid or moving bed operation may be employed if desired.

The effluent of hydrofining stage 320 is passed through line 322 to an intermediate section of conventional stabilizer-fractionator 330. This tower is so operated that a bottoms fraction of high quality heating or diesel oil my be recovered and passed to tankage via line 332. platformate having a final boiling point of about 400° F. may be passed via line 334 to blending tank 122 and gases containing about 80 to 95% of hydrogen and amounting to about 5000 to 12,000 s. c. f. per bbl. are recovered overhead through line 336. About 500 to 1500 s. c. f. per bbl. of the gas in line 336 may be vented as excess. The remainder is recycled by means of recycle booster 340 via lines 338 and 342 and reheater 344 to line 306 and hydroformer 300.

Rather than supplying merely the product light gas oil fraction from line 119 to hydrofining stage 320, any desired portion of the recycle stock from line 46 may be used for this purpose. In this case, the oil fraction recovered through line 332 may be returned as a whole or in part to line 46 to serve as an upgraded recycle stock for cracking stage 50.

In all other respects, operation of the entire combination unit may be substantially as described with reference to Figures 1 and 1A, including operation of crude still 10, tower 40, cracking stage 50, coking stage 82, etc.

Figure 4:
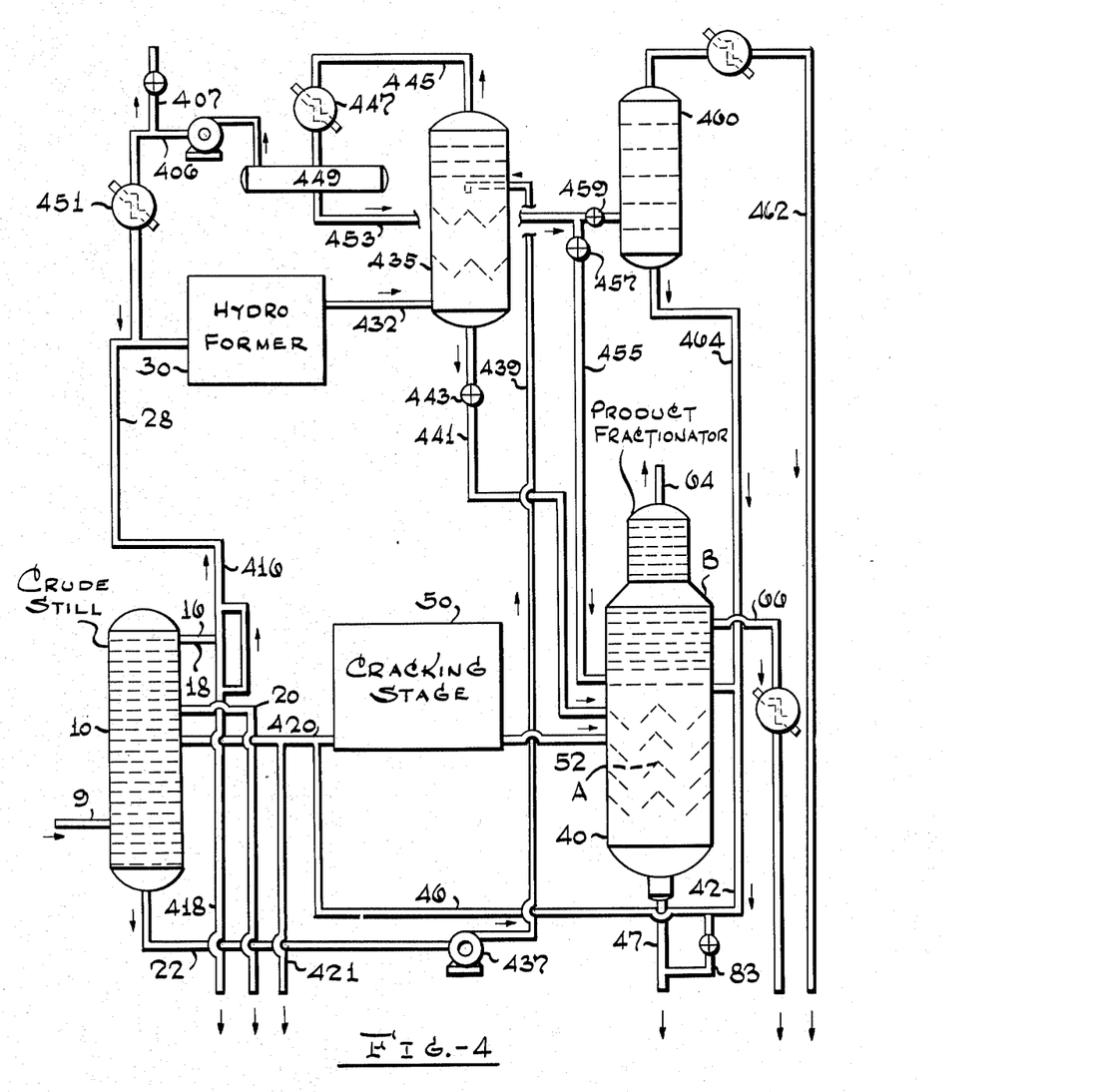

A third embodiment of the invention is illustrated in Figure 4 which is a schematical flow plan of a complete combination unit similar in various respects to that shown in Figures 1 and 1A, corresponding elements, though illustrated in a simplified manner, being identified by like reference numerals. An important additional element is a high pressure stripper 435 whose function will be forthwith described.

Referring now in detail to Figure 4, crude oil is charged via line 9 to crude still 10 and treated therein substantially as described with reference to Figure 1. A kerosene or light gas oil fraction ready for use may be recovered via line 20. Light naphtha is withdrawn through line 16, heavy naphtha through line 18 and reduced crude through line 22. In addition, a gas oil fraction may be recovered through line 420 and passed wholly or in part to cracking stage 50 to serve as virgin cracking stock therein. Virgin gas oil may be recovered as product via line 421. Any desired proportion of the light and heavy naphthas may be recovered via lines 416 and 418 as product or passed directly to the bottom of tower 40 as described with reference to Figures 1, 1A and 3.

In accordance with a preferred modification of this embodiment of the invention, the heavy naphtha from still 10, amounting to about 15 to 20% on crude, is passed to line 28 and hydroforming stage 30. The latter may be operated substantially as described for stage 30 and hydroformers 300, 302 and 304 with reference to Figures 1 and 3, recycle hydrogen being added via line 406 as will appear more clearly hereinafter.

The total effluent of hydroforming stage 30 is passed substantially at the temperature and pressure of stage 30, say, at about 800°–1000° F. and about 700–800 p. s. i. g. through line 432 to a bottom portion of high-pressure stripper 435. This stripper which may be of conventional design, having a lower disc-and-doughnut section C and an upper bubble tray section D, is maintained substantially at the pressure of reforming stage 30.

Reduced crude from line 22 is passed by pump 437 through line 439 at the pressure of stripper 435 to the top of section C of stripper 435 which is so designed that the temperature varies from about 600° to 800° F. in the bottom to about 500° to 750° F. in the top of stripper 435. At these conditions, the reduced crude supplied through line 439 is stripped of its gas oil and lower boiling constituents to an extent of about 5–35% on reduced crude depending on the type of crude involved. The stripped reduced crude now amounting to about 25 to 45% on crude is withdrawn through line 441 provided with pressure release valve 443 and passed to an upper portion of section A of tower 40, to be further stripped therein by cracked vapors supplied through line 52 from cracking stage 50 substantially as described with reference to Figures 1 and 1A.

A combined overhead containing the reduced crude strippings consisting chiefly of gas oil, the total hydroformate and the total hydrogen is withdrawn from stripper 435 via line 445, cooled in cooler 447 to about 80° to 120° F. and passed to gas liquid separator 449 substantially without pressure reduction other than that caused by cooling. The gas separated in separator 449, amounting to about 500 to 5000 s. c. f./bbl. and containing about 40 to 95% of hydrogen is withdrawn through line 406, reheated in reheater 451 to about 900° to 1200° F. and returned to hydroforming stage 30. Excess gas may be released through line 407 to be used as a fuel gas or in tower 40 as an additional stripping medium.

The total liquid separated in separator 449 may be passed through lines 453 and 455 provided with pressure release valve 457 to the fractionating section B of tower 40 to be fractionated therein substantially as described with reference to Figure 1A. If desired, part or all of the liquid in line 453 may be passed to a separate fractionator 460 after pressure release in valve 459. Product high quality hydroformate may be recovered overhead from tower 460 and recovered via line 462 to be blended in tank 122 of Figure 1A with finished gasoline from tower 40. A gas oil fraction may be withdrawn from tower 460 as bottoms via line 464 to be combined with the gas oil in line 42 and further treated as described with reference to Figures 1 and 1A.

Similarly as explained with reference to Figures 1, 1A and 3, the virgin naphtha in lines 16 and/or 18 may be all or in part supplied directly to the bottom of tower 40 to serve as a stripping medium for the reduced crude and corresponding amounts of similar fractions of tower 40 may be used as charging stock for hydroformer 30, as will be readily understood by those skilled in the art. Also, any desired portion of the virgin light naphtha in line 16 may be passed to reforming stage 30.

The above description and exemplary operations have served to illustrate specific embodiments of the invention but are not intended to be limiting in scope.

What is claimed is:

1. In a combination crude distillation and hydrocarbon conversion process, the improvement which comprises subjecting crude oil to distillation in a distillation zone to produce distillate fractions including a gas oil fraction and a naphtha cut and reduced crude, passing said reduced crude to a low pressure product fractionation zone, catalytically cracking said gas oil fractions and stripping said reduced crude in said product fractionation zone with vapors from said catalytic cracking operation subjecting a naphtha cut of said distillate fractions to catalytic reforming in a reforming zone yielding hydrogen, recovering stripped reduced crude bottoms from said product fractionation zone, withdrawing distillate fractions from said product fractionation zone and treating one of said last named distillate fractions with said hydrogen outside said reforming and product fractionation zones.

2. The process of claim 1 in which said fraction treated with said hydrogen is a light gas oil withdrawn from said product fractionation zone.

3. The process of claim 1 in which said fraction treated with said hydrogen is a heavy gas oil withdrawn from said product fractionation zone.

4. The process of claim 3 in which at least a portion of said treated heavy gas oil is subjected to cracking in a separate cracking zone and said reduced crude is stripped in said fractionation zone with products from said cracking zone.

5. The process of claim 1 in which at least a portion of said naphtha cut is passed from said distillation zone directly to said reforming zone.

6. The process of claim 1 in which at least a portion of said distillate fractions is passed from said distillation zone directly to said product fractionation zone to strip said reduced crude therein and a naphtha cut withdrawn from said fractionation zone is passed to said reforming zone to be reformed therein.

7. The process of claim 1 in which said distillate fractions consists essentially of heavy naphtha.

8. In a combination crude distillation and hydrocarbon conversion process, the improvement which comprises subjecting crude oil to distillation in a distillation zone to produce distillate fractions and reduced crude, passing said reduced crude to a low pressure product fractionation zone, stripping said reduced crude in said fractionation zone with vapors of at least a portion of said distillate fractions, subjecting a naphtha cut of said distillate fractions to catalytic reforming in a reforming zone yielding hydrogen, withdrawing an effluent comprising hydrogen and reformed naphtha from said reforming zone, separating hydrogen from reformed naphtha, recycling a portion of said hydrogen to said reforming zone, separately withdrawing a naphtha cut, light gas oil, heavy gas oil and stripped reduced crude from said fractionation zone, subjecting at least a portion of said heavy gas oil to catalytic cracking in a cracking zone, returning cracked products from said cracking zone to said fractionation zone to strip said reduced crude therein and treating at least a portion of said light gas oil with a portion of said hydrogen in a separate hydrogen treating zone.

9. The process of claim 8 in which at least a portion of said heavy gas oil is treated with a portion of said hydrogen in a separate hydrogen treating zone prior to being passed to said cracking zone.

10. In a combination crude distillation and hydrocarbon conversion process, the improvement which comprises subjecting crude oil to distillation in a distillation zone to produce distillate fractions and reduced crude, passing reduced crude to a low pressure product fractionation zone, stripping said reduced crude in said fractionation zone with vapors of at least a portion of said distillate fractions, subjecting a naphtha cut of said distillate fractions to catalytic reforming in a reforming zone yielding hydrogen, withdrawing an effluent comprising hydrogen and reformed naphtha from said reforming zone, separately withdrawing naphtha, gas oil and stripped reduced crude from said fractionation zone, subjecting at least a portion of said gas oil to catalytic cracking in a cracking zone, returning cracked products from said cracking zone to said fractionation zone to strip said reduced crude therein, treating hydrocarbon materials produced in said process with at least a portion of said hydrogen outside said fractionation and reforming zones and recycling a portion of said hydrogen to said reforming zone.

11. A combination process for producing motor fuel which comprises fractionating crude petroleum oil in a distillation zone into a plurality of fractions including a reduced crude fraction, a gas oil fraction, a heavy naphtha fraction, and a light naphtha fraction, passing the reduced crude fraction to a stripping zone maintained under a relatively low pressure, catalytically hydroforming the heavy naphtha fraction in a hydroforming zone, stripping the reduced crude fraction in said stripping zone with gaseous products from said hydroforming zone and with at least a portion of the light naphtha fraction from said distillation zone, removing a stripped reduced crude fraction from said stripping zone, catalytically cracking the gas oil fraction from said distillation zone, passing the catalytically cracked vapors into said stripping zone to act as additional stripping medium, fractionating vapors in said stripping zone to produce distillate fractions including motor fuel, and treating one of said distillate fractions from said stripping zone with hydrogen produced in said hydroforming zone in a zone separate from said hydroforming zone and said stripping zone.

12. The process according to claim 11 in which the catalytic hydroforming step is carried out at a temperature of about 800° to 1000° F., at a pressure of about 400 to 1000 p. s. i. g. and at hydrogen feed rates of about 3,000 to 12,000 standard cubic feet per barrel of naphtha to be reformed.

References Cited in the file of this patent

UNITED STATES PATENTS

| | | |
|---|---|---|
| 2,174,858 | Keith, Jr. | Oct. 3, 1939 |
| 2,205,434 | Phinney | June 25, 1940 |
| 2,312,445 | Ruthruff | Mar. 2, 1943 |
| 2,366,218 | Ruthruff | Jan. 2, 1945 |
| 2,417,308 | Lee | Mar. 11, 1947 |
| 2,502,958 | Johnson | Apr. 4, 1950 |